United States Patent [19]

Nold

[11] Patent Number: 4,806,814

[45] Date of Patent: Feb. 21, 1989

[54] HALF-WAVE ROTARY RECTIFIER ASSEMBLY

[75] Inventor: Robert D. Nold, Rockford, Ill.

[73] Assignee: Sundstrand Corporation, Rockford, Ill.

[21] Appl. No.: 121,127

[22] Filed: Nov. 16, 1987

[51] Int. Cl.$^4$ ............................................. H02K 11/00
[52] U.S. Cl. .................................. 310/68 D; 310/71; 310/168; 363/145
[58] Field of Search .................... 310/68 D, 68 R, 71, 310/168; 363/141, 144, 145

[56] References Cited

U.S. PATENT DOCUMENTS

| | | | |
|---|---|---|---|
| 3,447,118 | 5/1969 | Ferree | 317/61 |
| 3,471,157 | 10/1969 | Swearingen | 277/174 |
| 3,619,731 | 11/1971 | Baker et al. | 317/234 R |
| 3,753,052 | 8/1973 | Rosser | 317/234 R |
| 4,321,493 | 3/1982 | Wefel | 310/68 D |
| 4,329,603 | 5/1982 | Ballard | 310/64 |
| 4,338,552 | 7/1982 | Romanczuk et al. | 361/388 |
| 4,494,171 | 1/1985 | Bland et al. | 361/386 |
| 4,499,485 | 2/1985 | Schierz et al. | 357/74 |
| 4,523,121 | 6/1985 | Takahashi et al. | 310/334 |
| 4,538,171 | 8/1985 | Stevens et al. | 357/81 |
| 4,570,094 | 2/1986 | Trommer | 310/68 R |
| 4,581,695 | 4/1986 | Hoppe | 363/145 |
| 4,603,344 | 7/1986 | Trommer | 357/76 |
| 4,628,219 | 12/1986 | Troscinski | 310/68 D |

FOREIGN PATENT DOCUMENTS 884588 10/1971 Canada .
763354 12/1956 United Kingdom .

Primary Examiner—Patrick R. Salce
Assistant Examiner—Judson H. Jones
Attorney, Agent, or Firm—Wood, Dalton, Phillips, Mason & Rowe

[57] ABSTRACT

In a brushless synchronous generator having a three phase, WYE connected exciter armature providing current which is rectified by a half-wave rectifier before energizing a field of a main generator, a conductor is required to couple a neutral lead of the exciter armature to a negative input terminal of the main generator field.

In order to overcome the foregoing problem, a rotary rectifier assembly for a brushless synchronous generator is disclosed. The rotary rectifier assembly comprises a housing, three diodes, three resistors, wherein the diodes and the resistors are interconnected to form a three phase half-wave rectifier bridge within the housing, and a neutral conductor coupled between the neutral output lead and the negative input lead and carried within the housing.

5 Claims, 3 Drawing Sheets

HALF-WAVE ROTARY RECTIFIER ASSEMBLY

FIELD OF THE INVENTION

This invention relates to a half-wave rotary rectifier assembly and, more particularly, to a rotary rectifier assembly for use with a brushless synchronous generator.

BACKGROUND OF THE INVENTION

In many synchronous generators it is highly desirable to eliminate brushes since they frequently require maintenance and/or replacement, and are perhaps the single weakest point in the system in terms of breakdowns. Moreover, by its very nature, the electrical path between a brush and a commutator is subject to arcing which may introduce transients into the electrical energy being produced, which in turn, may interfere with proper operation of some types of electrical loads on the generator.

A typical brushless generator has three distinct generating systems including a main generator, an exciter, and a permanent magnet generator. The permanent magnet generator includes permanent magnets for establishing a magnetic field which is employed to induce current in a set of windings, which in turn is employed after rectification to generate a magnetic field in the exciter. The magnetic field in the exciter is in turn employed to induce an even higher level of current, typically three-phase alternating current, which is then rectified and employed to generate the magnetic field for the main generator by flowing the DC current through the main field winding of the generator system.

In order to avoid the use of brushes, it is necessary that the magnetic field in the main generator be in the rotor so that the output of the system can be taken from the stator of the main generator. In order to generate a suitable magnetic field in the rotor, it is necessary to utilize direct current, as opposed to alternating current, for the same. Since the output of the exciter is an alternating current, this current must be rectified by a rectifier assembly to direct current. And, again, in order to avoid resort to brushes, it is accordingly necessary that the rectifier assembly interconnecting the exciter and the main generator field winding be carried by the rotor of the generator. Such a rectifier assembly should also be capable of withstanding high centrifugal loading.

In certain configurations, the exciter armature is delta connected or WYE connected with a floating neutral, and the rectifier assembly is a full-wave diode bridge. One such full-wave rectifier assembly is disclosed in commonly owned U.S. Pat. No. 4,628,219, issued Dec. 9, 1986 to Troscinski, the details of which are herein incorporated by reference.

However, in certain other configurations, the rectifier assembly comprises a half-wave rectifier, and the exciter armature is WYE connected to positive and negative input terminals of the main generator field through the use of this rectifier assembly. Specifically, the exciter armature has three power leads and one neutral lead. The rectifier assembly has three diodes enclosed in a housing and coupled as a half-wave bridge. The diodes are individually coupled to their respective exciter armature power output leads and mutually coupled to the generator field positive input terminal, and the exciter armature neutral lead must be coupled to the generator field negative input terminal. In these configurations, means must be provided for electrically coupling the exciter armature neutral lead to the generator field negative input terminal.

Coolant oil is typically provided to the rectifier assembly housing to remove heat from the diodes. Accordingly, the rectifier assembly must remain sealed to prevent any leakage of the oil at unwanted locations.

The present invention is directed to overcoming one or more of the above problems.

SUMMARY OF THE INVENTION

It is the object of this invention to provide a half-wave rotary rectifier assembly for a brushless synchronous generator including a three phase, WYE connected exciter armature having exciter output leads comprising three power output leads and a neutral output lead and further including a main generator field having positive and negative input terminals.

In accordance with this invention, the rotary rectifier assembly comprises a housing, three diodes, three resistors, and means interconnecting the diodes and resistors for forming a three phase half-wave rectifier bridge within the housing. The interconnecting means includes a neutral conductor coupled between the exciter armature neutral output lead and the generator field negative input lead and carried within the housing.

The neutral conductor is disposed longitudinally within the housing and has an input end associated with the exciter and an output end associated with the generator field. A radial opening is provided through the housing, and an electrical terminal plug having an input end and an output end extends through the radial opening with the output end secured in a conducting relationship to the input end of the neutral conductor. The neutral output lead is conductively secured to the input end of the electrical terminal plug, and the output end of the neutral conductor is conductively secured to the negative generator field lead.

It is further comprehended that an O-ring seal be disposed between the radial opening and the electrical terminal plug to prevent coolant oil within the housing from escaping through the radial opening.

Other features and advantages of the invention will be apparent from the following description taken in connection with the associated drawings.

DESCRIPTION OF THE PREFERRED EMBODIMENT

Figure 1:
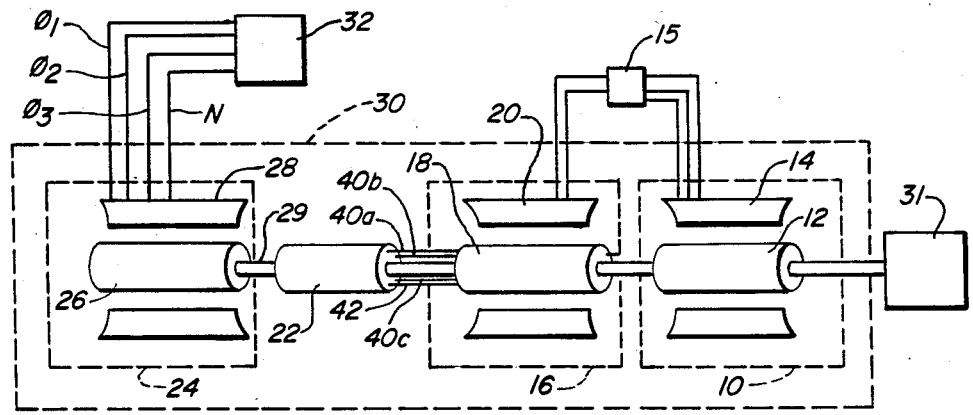
FIG. 1 is a mechanical schematic of a synchronous generator that may use a half-wave rectifier assembly made according to the invention.

A typical synchronous generator is illustrated in FIG. 1. The generator includes a permanent magnet generator (PMG) 10 having a rotating permanent magnet assembly 12 and a stationary PMG armature 14, a stationary first rectifier assembly 15, an exciter 16 having a rotating exciter armature 18 and a stationary exciter field 20, a rotating second rectifier assembly 22 and a main generator 24 having a rotating main generator field 26 and a stationary main generator armature 28. Thus the permanent magnet assembly 12, exciter armature 18, rotating rectifier 22 and main generator field 26 define a rotor, generally designated 29, rotatable within a stator, generally designated 30, in turn including the PMG armature 14, exciter field 20 and main generator armature 28.

As is well known in the art, rotation of the permanent magnet assembly 12 induces an AC current in the PMG armature 14. The induced AC current is rectified by the first rectifier assembly 15, and the rectified current excites the exciter field 20. The exciter field 20 induces an AC current in the rotating exciter armature 18, which is rectified by the rotating rectifier assembly 22 to excite the main generator field 26.

The rotating main generator field 26 induces a three phase output in the main generator armature 28 to power a load 32.

Figure 2:
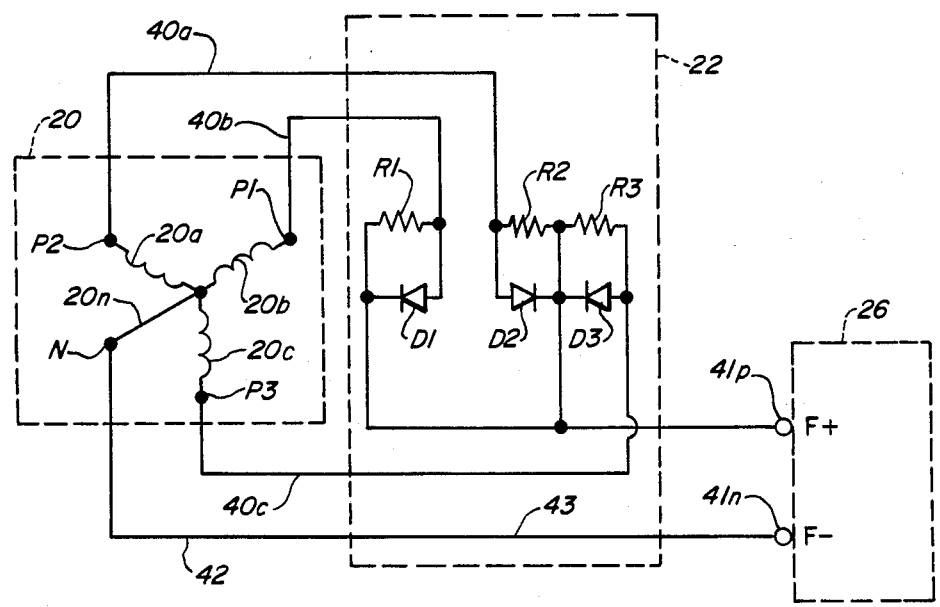
FIG. 2 is an electrical schematic a half-wave rectifier assembly, an exciter armature and a generator field, wherein the rectifier assembly is WYE connected to the exciter armature.

The three phase exciter armature has three power output leads 40a,b,c and a neutral output lead 40n. The rotating rectifier assembly 22 comprises a half-wave diode bridge, as discussed in greater detail below. An electrical schematic of the rotating rectifier assembly 22 coupling the exciter armature 20 to the main generator field 26 is illustrated in FIG. 2.

The exciter armature 20 has three exciter armature windings 20a,b,c and a neutral tap 20n. The main generator field 26 includes positive and negative input terminals 41p, 41n, respectively. Each of the exciter armature windings 20a,b,c are coupled to a respective one of the power output leads 40a,b,c. The rotating rectifier assembly 22 includes three diodes D1, D2, D3, each connected in parallel with a respective one of three resistors R1, R2, R3. The cathode ends of the diodes D1, D2, D3 are mutually coupled to the generator field positive input terminal 41p, and the anode ends of each of the diodes D1, D2, D3 are coupled to a respective power output lead 40a,b,c. The neutral lead 42 is coupled to the generator field negative input terminal 41n by a neutral conductor 43 carried within the rectifier assembly 22. The rectifier assembly provides the main generator field 26 with half-wave rectification of the three phase current generated by the exciter armature 18.

Figure 3:
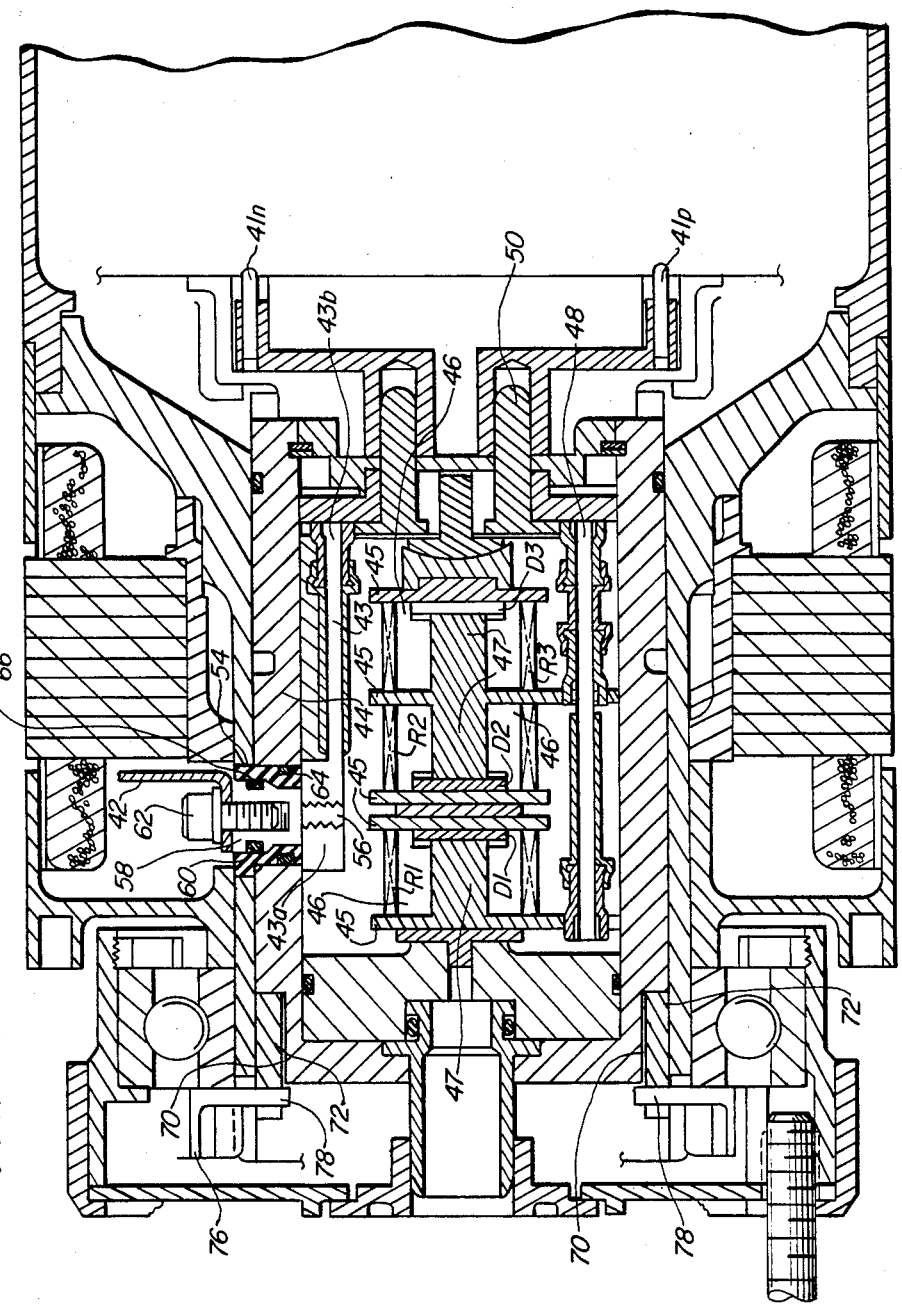
FIG. 3 is a sectional view of a rectifier assembly in accordance with the present invention.

The rotating rectifier assembly 22 is illustrated in FIG. 3 and is seen to include an elongated, generally cylindrical housing 44. Contained within the housing 44 are five conductors 45 which are formed in the configurations illustrated and of a material that is a good thermal and electrical conductor. The conductors 45 are aligned with each other to form a stack, and the three diodes D1, D2, D3, without their customary packaging, including terminals, are sandwiched between the conductors 45. The conductors 45 also sandwich the three resistors R1, R2, R3 in parallel with their respective diodes D1, D2, D3. The resistors R1, R2, R3 may be wound on bobbins 46 located between the conductors 45. Three of the conductors 45 include contact stub portions 47 which are sized to maintain the conductors 45, the diodes D1, D2, D3, and the resistors R1, R2, R3 in good contact and to provide support for the bobbins 46.

As described above with reference to FIG. 2, the three diodes D1, D2, D3 and the three resistors R1, R2, R3 are mutually interconnected by the conductors 45 as a half-wave rectifier diode bridge.

The cathode ends of the three diodes D1, D2, D3 are joined by a common bus 48 to a male output terminal 50 which plugs into the generator field positive input terminal 41p.

The neutral lead 42 of the exciter armature 18 is coupled to the generator field negative input terminal 41n by the neutral conductor 43. The neutral conductor 43 is disposed longitudinally within the housing 44 and has an input end generally designated 43a and an output end generally designated 43b. The neutral conductor 43 is not required by the rectifier assembly 22, but rather is carried by the rectifier assembly 22 so that other components can be coupled to the neutral conductor 43. This arrangement provides a more compact package wherein all of the leads necessary for coupling the exciter armature 18 to the main generator field 26 are provided in one convenient location.

A radial opening 54 is provided in the housing 44. The neutral conductor 43 has a radially outward directed threaded female coupling 56 positioned immediately below the radial opening 54 of the housing 44. An electrical terminal plug 58 extends through the radial opening 54 and is threaded into the female coupling 56 of the neutral conductor 43. An insulator spacer 60 is disposed between the radial opening 54 and the electrical terminal plug 58. A bolt 62 is threaded into the electrical terminal plug 58 to secure the exciter armature neutral lead 42 to the electrical terminal plug 58.

As oil is typically provided within the housing 44 as a coolant, a first O-ring 64 is disposed between the radial opening 54 and the insulator spacer 60, and a second O-ring 66 is disposed between the insulator spacer 60 and the electrical terminal plug 58. The O-rings 64, 66 insure that the coolant oil does not leak through the connection, especially when the rectifier assembly 22 is rotating at high velocities.

Figure 4:
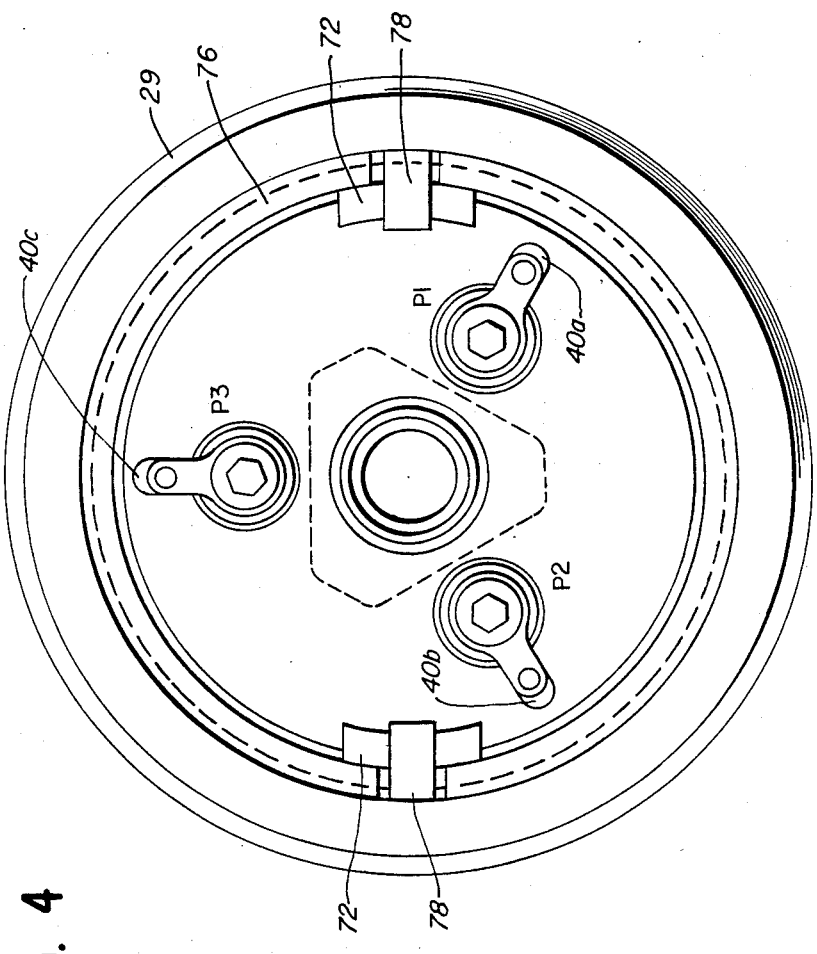
FIG. 4 is an end view of the rectifier assembly illustrated in FIG. 3.

Means for properly aligning the housing 44 within the rotor 29 is illustrated in FIGS. 3 and 4. The housing 44 is provided with opposing, inwardly extending grooves 70. A pair of outwardly directed slotted locator pins 72 are placed one in each of the respective grooves 70. A retaining ring 76 having a pair of opposing inwardly directed fingers 78 is secured to the rotor 29, by means not shown, the fingers 78 being received by the slot of the respective locator pin 72.

I claim:
1. A rotary rectifier assembly for a brushless synchronous generator including,
    a three phase, WYE connected exciter armature having exciter output leads comprising three power output leads and a neutral output lead and,
    a main generator field having positive and negative input leads, said rotary rectifier assembly comprising:
    a rotating housing;
    three diodes;
    three resistors; and
    means interconnecting said diodes and resistors for forming a three phase half-wave rectifier bridge within said rotating housing, said interconnecting means including a neutral conductor coupled between said neutral output lead and said negative input lead and carried within said rotating housing.
2. A rotary rectifier assembly for a brushless synchronous generator including,
    a three phase, WYE connected exciter armature having exciter output leads comprising three power output leads and a neutral output lead and, a main generator field having positive and negative input leads, said half-wave rectifier assembly comprising:

a elongated housing;

three diodes within said housing;

three resistors, each within said housing associated with a respective one of said diodes; and means coupling said diodes and resistors as a three phase half-wave rectifier between said exciter output leads and said generator field leads, said coupling means including a neutral conductor disposed longitudinally within said housing and having an input end associated with said exciter and an output end associated with said generator field, a radial opening through said housing, an electrical terminal plug having an input end and an output end, said electrical terminal plug extending through said radial opening with said output end secured in a conducting relationship to said input end of said neutral conductor, means for conductively securing said neutral output lead to said input end of said electrical terminal plug, and means for electrically connecting said output end of said neutral conductor to said negative generator field lead.

3. A rotary rectifier assembly for a brushless synchronous generator including a three phase exciter armature having three power output leads and a neutral output lead and a main generator field having positive and negative input leads, said rectifier assembly comprising:

an elongated, generally cylindrical housing containing first, second and third diodes, first, second and third resistors and a coolant fluid for removing heat from said diodes;

a radial opening through said housing;

means within said housing interconnecting said diodes and resistors for providing a three phase half-wave rectifier, said interconnecting means being coupled between said exciter output leads and said positive and negative generator input leads and including, a longitudinally directed neutral conductor disposed within said housing and having an input end forming a radially directed female connector located below said opening and an output end;

an electrical terminal plug having a threaded input end, said electrical terminal plug extending through said radial opening and being secured in a conducting relationship to said neutral conductor female connector;

means for electrically coupling said output end of said neutral conductor to said negative generator field lead;

a bolt disposed in said input end of said electrical terminal plug for securing said neutral output lead in a conducting relationship to said electrical terminal plug; and an O-ring seal disposed between said radial opening and said electrical terminal plug, said O-ring seal preventing said coolant fluid from escaping through said radial opening.

4. The rotary rectifier assembly of claim 3 in combination with a brushless generator having a three phase exciter armature with three power leads and one neutral lead and a main generator having positive and negative input leads, and means connecting each of said diodes to a respective power output lead and to said positive input lead, and means connecting said neutral conductor to said neutral output lead and to said negative input lead.

5. A rotary rectifier assembly for a brushless synchronous generator including, a three phase, WYE connected armature having exciter output leads comprising three power output leads and a neutral output lead and, a main generator field having positive and negative input leads, said half-wave rectifier assembly comprising:

an elongated housing;

three diodes within said housing;

three resistors, each within said housing associated with a respective one of said diodes; and means coupling said diodes and resistors as a three phase half-wave rectifier between said exciter output leads and said generator leads, said coupling means including a neutral conductor disposed within said housing and having an input lead associated with said exciter and an output lead associated with said generator field, an opening through said housing, means for conductively securing said neutral output lead through said opening to said generator negative output lead.

* * * * *